US012092317B1

(12) United States Patent
Marques

(10) Patent No.: US 12,092,317 B1
(45) Date of Patent: Sep. 17, 2024

(54) OIL LAMP FOR DECK RAILING

(71) Applicant: Paul Marques, Deptford, NJ (US)

(72) Inventor: Paul Marques, Deptford, NJ (US)

( * ) Notice: Subject to any disclaimer, the term of this patent is extended or adjusted under 35 U.S.C. 154(b) by 0 days.

(21) Appl. No.: 18/531,231

(22) Filed: Dec. 6, 2023

(51) Int. Cl.
*F21V 37/00* (2006.01)

(52) U.S. Cl.
CPC ................................ *F21V 37/0004* (2013.01)

(58) Field of Classification Search
CPC ......................................... F21V 37/0004–0037
See application file for complete search history.

(56) References Cited

U.S. PATENT DOCUMENTS 10,273,713 B2 4/2019 Sachakov et al.
11,655,975 B2 5/2023 Sohn et al.

*Primary Examiner* — Jason M Han

(74) *Attorney, Agent, or Firm* — Sanchelima & Associates, P.A.; Christian Sanchelima; Jesus Sanchelima

(57) ABSTRACT

A oil lamp for deck railing including a container assembly, a torch assembly, and a base assembly. The container assembly includes a cylindrical container made of glass. The torch assembly includes a height-adjustable wick having a bottom end within the cylindrical container and a top end protruding therefrom. The base assembly includes a base having fasteners. The fasteners are operated to attach the base to the deck railing. The container is attached to a top end of the base. The base includes a receiving member in the form of a central circular opening suitable to receive the container.

11 Claims, 3 Drawing Sheets

OIL LAMP FOR DECK RAILING

BACKGROUND OF THE INVENTION

1. Field of the Invention

The present invention relates to an oil lamp for deck railing and, more particularly, to an oil lamp for deck railing that includes a cylindrical oil container that allows see therethrough to identify the amount of remaining oil.

2. Description of the Related Art

Several designs for oil lamps have been designed in the past. None of them, however, include a base that allows securing the oil lamp to the railing support post or fence partition post.

Applicant believes that a related reference corresponds to U.S. Pat. No. 11,655,975 issued for a lamp apparatus that includes a reservoir for flammable liquids and a wick that can be incorporated with a post and within the cap of a post, such as a deck or fence post. Applicant believes that another related reference corresponds to U.S. Pat. No. 10,273,713 issued for a modified fence post and a method for modifying the fence post to hold a torch or lamp. None of these references, however, teach of an oil lamp and support having a base for mounting onto the top of a flat post on a deck or porch railing.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a oil lamp for deck railing that includes a ceramic base portion to deflect heat away from the post and the oil lamp.

It is another object of this invention to provide a oil lamp for deck railing that includes an adjustment gear knob to lower or raise the wick to provide variation of flame light.

It is still another object of the present invention to provide a oil lamp for deck railing that includes a lid to cover the wick when the oil lamp is not in issue.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
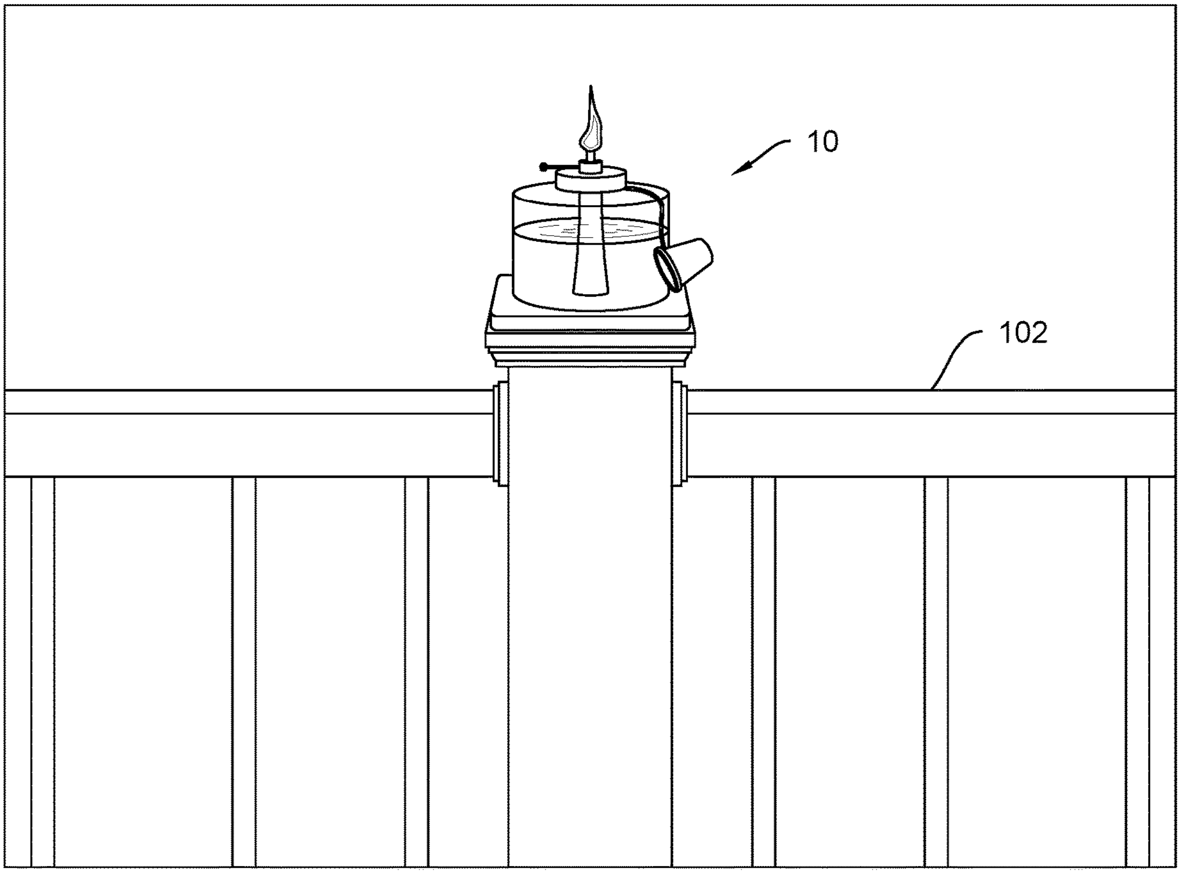
FIG. 1 represents an isometric operational view of the present invention 10 placed on post 102.
Figure 2:
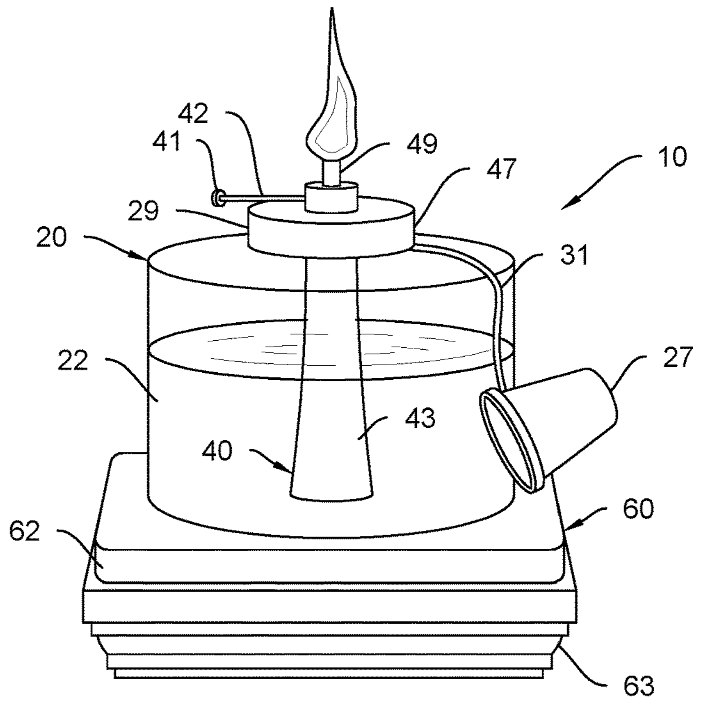
FIG. 2 shows an isometric view of the present invention 10 having the lid 27 removed. The present invention includes a container assembly 20, a torch assembly 40 and a base assembly 60.
Figure 3:
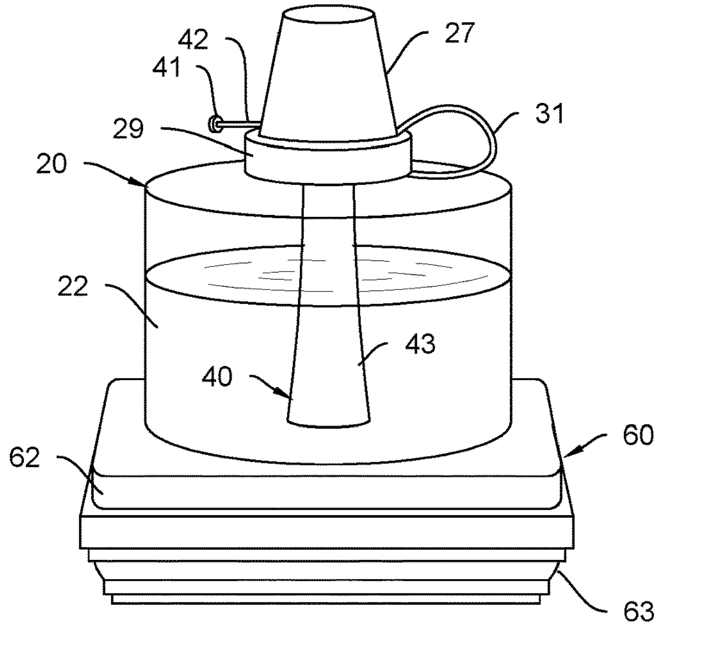
FIG. 3 illustrates an isometric view of the present invention 10 having the top covered by lid 27.
Figure 4:
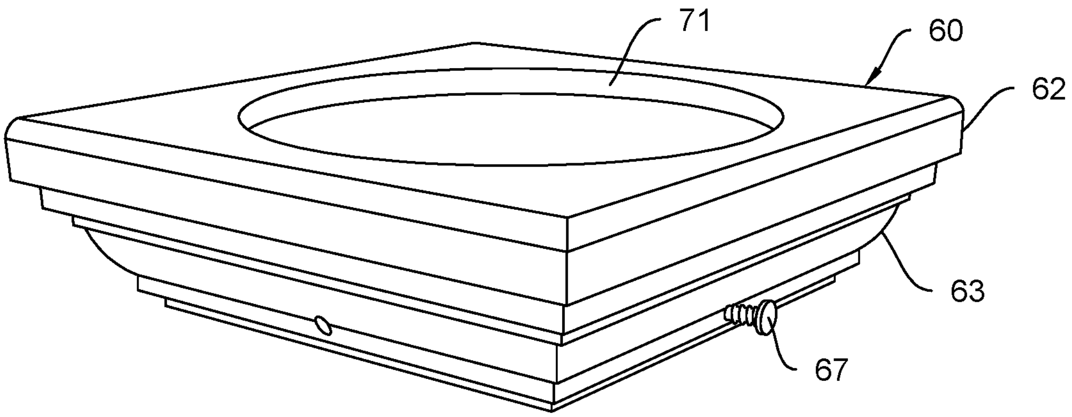
FIG. 4 is an isometric view of the base assembly 60 including a a top base 62, a bottom base 63, fasteners 67 and an interior wall 69.

Referring now to the drawings, where the present invention is generally referred to with numeral 10, it can be observed that it basically includes a container assembly 20, a torch assembly 40, and a base assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do The container assembly 20 includes a container 22, a lid 27 connected to the container 22 through the connector 31. The container 22 may have a cylindrical shape. It also may be suitable for the container 22 to have a rectangular shape, a triangular shape, or any other suitable shape. The container 22 may be made of glass. It also may be suitable for the container 22 to be made of aluminum, metal, or any other suitable material. The container 22 may contain oil therein. The container 22 may be heat resistant.

The lid 27 may be connected to a top open end of the container 22. The container 22 may have a neck on a top portion thereof with an opening therein. The neck of the container 22 may be threaded to receive an inner threaded portion of the lid 27. The lid 27 may be made of iron, aluminum, or any other resistant material. The lid 27 may have a frustoconical shape with an open bottom portion. The connector 31 may be made of aluminum, iron, or any other resistant material.

The torch assembly 40 includes an adjustment member 41, adjustment gear knob 42, a wick 49, and an attachment member 47. The attachment member 47 may have a cylindrical shape. The attachment member 47 may be attached to a top end of the container 22 surrounding the bottle of the container 22. The attachment member 47 may be made of aluminum, iron, or any other suitable material.

The attachment member 47 may have the adjustment gear knob 42 installed therein. The adjustment gear knob 42 may have the wick 49 going therethrough. The adjustment gear knob 42 may include a rotating mechanism capable of rotate to move up and down the wick 49. The adjustment gear knob 42 may be operated through the adjustment member 41. The adjustment member 41 may have a rod shape. It also may be suitable for the adjustment member 41 to have a rectangular shape, a triangular shape or any other suitable shape. The adjustment member 41 may move outwardly and inwardly through the adjustment gear knob 42. It should be understood that the rotating mechanism to move up and down the wick 49 may be any transmission mechanism known in the prior art. In a preferred embodiment the wick 49 may be made of braided cotton, or any other suitable material. The wick 49 may be vertically suspended into the oil within the container 22 and protruding from the adjustment gear knob 42.

The base assembly 60 includes a top base 62, a bottom base 63 and a fasteners 67. The top base 62 may have a rectangular shape with rounded corners. It also may be suitable for the top base 62 to have a cylindrical shape, a triangular shape, or any other suitable shape. The top base 62 may be made of a ceramic material. It also may be suitable for the top base 62 to be made of iron, aluminum, or any other resistant material. The top base 62 may include receiving member 71. The receiving member 71 may be a circular formed on a top end of the top base 62 suitable to receive the container 22 therein. It also may be suitable for the receiving member 71 to have a rectangular shape, a triangular shape, or any other suitable shape. The top base 62 may deflect heat away from the post and the oil lamp.

Figure 5:
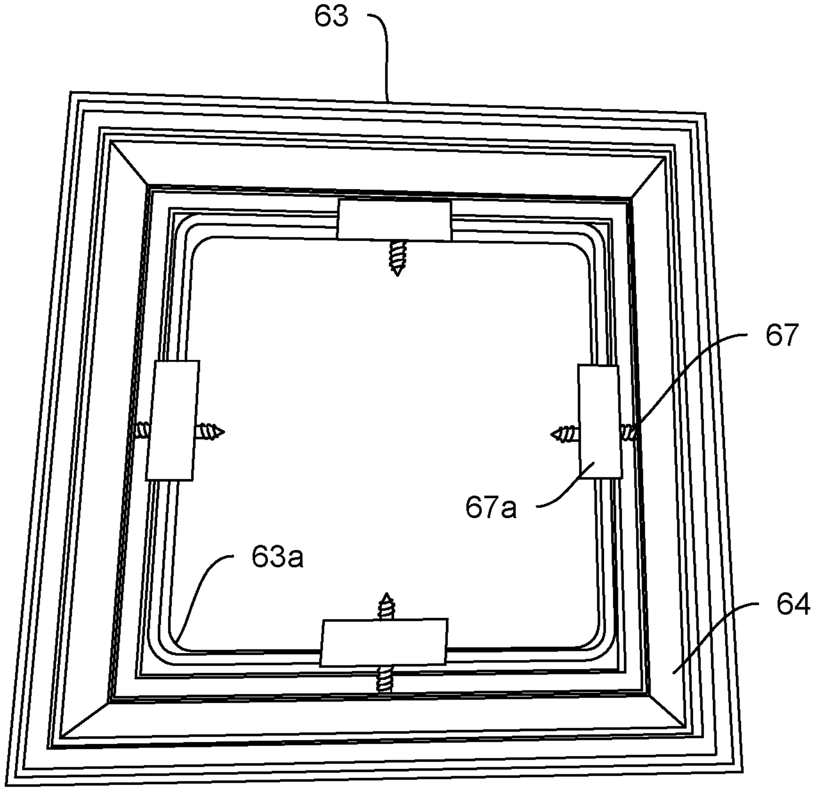
FIG. 5 is an illustration of a bottom view of the base assembly 60.

The bottom base 63 may substantially have a truncated cone shape. The bottom base 63 may be made of a vinyl material. It also may be suitable for the bottom base 63 to be made of iron, steel, or any other suitable material. The bottom base 63 may have a shape which adapts to the top end of a railing support post 102. The bottom base 63 may include curved outer surfaces. The bottom base 63 may be hollow. The bottom base 63 may include a inner wall 63*a* extending an inner circumference of the bottom base 63. As best illustrated in FIG. 5, the fasteners 67 may transversely go through the inner wall 63*a*. The inner wall 63*a* may go through a portion of the railing support post 102 to fix the bottom base 63 to the railing support post 102. The fasteners 67 may include mounting screws 67*a*. The mounting screws 67*a* may be used to secure fastening of the fasteners 67 to the railing support post 102. The mounting screws 67*a* may be rectangular perforated member which may prevent the fasteners 67 from accidentally slip away from the bottom base 63. The fasteners 67 may be a screw or any other fixing member to allow fixing the present invention 10 to the railing support post 102. The fasteners 67 may preferably be made of a metal material, or any other resistant material. It should be understood that the bottom base 63 may include openings to receive the fasteners 67 therethrough. In a preferred embodiment illustrated in FIG. 1A, the bottom base 63 may be used to fix the base assembly 60 to the railing support post 102 and then place the container 22 in the receiving member 71. In a preferred embodiment the receiving member 71 includes adhesive impregnated therein to adhere the container 22 to the receiving member 71.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An oil lamp for deck railing, comprising:

a container assembly, wherein said container assembly includes a cylindrical container made of glass;

a torch assembly, wherein said torch assembly includes a height-adjustable wick having a bottom end within said container and a top end protruding therefrom, wherein said torch assembly includes an adjustment member, an adjustment gear knob and an attachment member, wherein said attachment member has a cylindrical shape and is attached to a top end of said container, wherein said adjustment gear knob is installed atop of said attachment member, wherein said adjustment gear knob is operated by means of said adjustment member to move up and down said wick to adjust said wick goes through said adjustment gear knob; and a base assembly, wherein said base assembly includes a base having fasteners, said fasteners are operated to attach said base to said deck railing, said container is attached to a top end of said base, wherein said base includes a receiving member in the form of a central circular opening suitable to receive said container.

2. The oil lamp for deck railing set forth in claim 1, wherein said container has a top portion, said open top portion capable of receiving said wick and to introduce oil within said container.

3. The oil lamp for deck railing set forth in claim 2, wherein said container assembly includes a lid threadably attached to said container to cover said wick and said open top portion.

4. The oil lamp for deck railing set forth in claim 3, wherein said lid is attached to said container by means of a connector having an elongated shape, said connector is flexible.

5. The oil lamp for deck railing set forth in claim 1, wherein said base assembly includes a top base having a rectangular shape with rounded corners, said top base including a receiving member in the form of a central circular opening suitable to receive said container.

6. The oil lamp for deck railing set forth in claim 5, wherein said receiving member includes adhesive impregnated therein.

7. The oil lamp for deck railing set forth in the claim 5, wherein said base assembly includes a bottom base extending from said top base, wherein said top base is hollow, wherein a top of railing post is inserted into said top base.

8. The oil lamp for deck railing set forth in the claim 7, wherein said bottom base includes inner wall thereinto.

9. The oil lamp for deck railing set forth in the claim 7, wherein said bottom base is fixed to said railing post by means of said fasteners, wherein said fasteners transversely go through said bottom base and said inner wall.

10. An oil lamp for deck railing, comprising:

a container assembly, wherein said container assembly includes a cylindrical container made of glass;

a torch assembly, wherein said torch assembly includes a height-adjustable wick having a bottom end within said container and a top end protruding therefrom; and a base assembly, wherein said base assembly includes bottom base a top base and fasteners, said fasteners are operated to attach said base to said deck railing, said top base has a rectangular shape with rounded corners, said top base including a receiving member in the form of a central circular opening suitable to receive said container, wherein said receiving member includes adhesive impregnated therein, wherein said top base is hollow, wherein a top of railing post is inserted into said top base, wherein said bottom base includes inner wall thereinto, wherein said bottom base is fixed to said railing post by means of fasteners, wherein said fasteners transversely go through said bottom base and said inner wall.

11. An oil lamp for deck railing, consisting of:

a container assembly, wherein said container assembly includes a cylindrical container made of glass and a lid, wherein said container has a top open portion, wherein said lid is attached to said container by means of a connector having an elongated shape, said connector is flexible;

a torch assembly, wherein said torch assembly includes a wick having a bottom end within said container and a top end protruding therefrom, an adjustment member, an adjustment gear knob and an attachment member, wherein said attachment member has a cylindrical shape and is attached to a top end of said container, wherein said adjustment gear knob is installed atop of said attachment member, wherein said adjustment gear knob is operated by means of said adjustment member to move up and down said wick to adjust, said wick goes through said adjustment gear knob, said open top portion capable of receiving said wick and to introduce oil within said container, wherein said lid is threadably attached to said container to cover said wick and said open top portion; and a base assembly, wherein said base assembly includes bottom base a top base and fasteners, said fasteners are operated to attach said base to said deck railing, said top base has a rectangular shape with rounded corners, said top base including a receiving member in the form of a central circular opening suitable to receive said container, wherein said receiving member includes adhesive impregnated therein, wherein said top base is hollow, wherein a top of railing post is inserted into said top base, wherein said bottom base includes inner wall thereinto, wherein said bottom base is fixed to said railing post by means of fasteners, wherein said fasteners transversely go through said bottom base and said inner wall, wherein said bottom base is made of a vinyl material, wherein said top base is made of a ceramic material, wherein said fastener are secured to walls of said bottom base by means of mounting screws.

* * * * *